(12) United States Patent
Cook

(10) Patent No.: US 11,070,517 B2
(45) Date of Patent: Jul. 20, 2021

(54) BRIDGING WITH WEB MANAGER ACCESS

(71) Applicant: Lantronix, Inc., Irvine, CA (US)

(72) Inventor: Steve Cook, Irvine, CA (US)

(73) Assignee: Lantronix, Inc., Irvine, CA (US)

(*) Notice: Subject to any disclaimer, the term of this patent is extended or adjusted under 35 U.S.C. 154(b) by 603 days.

(21) Appl. No.: 15/360,542

(22) Filed: Nov. 23, 2016

(65) Prior Publication Data

US 2017/0149732 A1  May 25, 2017

Related U.S. Application Data

(60) Provisional application No. 62/260,139, filed on Nov. 25, 2015.

(51) Int. Cl.
*G06F 15/16* (2006.01)
*H04L 29/12* (2006.01)

(52) U.S. Cl.
CPC ...... *H04L 61/2015* (2013.01); *H04L 61/1511* (2013.01); *H04L 61/2061* (2013.01); *H04L 61/2084* (2013.01); *H04L 61/256* (2013.01); *H04L 61/6022* (2013.01); *H04L 61/6068* (2013.01)

(58) Field of Classification Search
CPC .......... H04L 61/2015; H04L 61/1511; H04L 61/2061; H04L 61/2084; H04L 61/256; H04L 61/6022; H04L 61/6068; H04L 29/12066; H04L 29/12113; H04L 29/1233; H04L 29/12462; H04L 29/12915; H04L 29/12924; H04L 61/255; H04L 61/6059; H04L 67/02; H04W 84/12; H04W 88/08; H04W 8/26

USPC ....... 709/203, 206, 220, 221, 223, 224, 227, 709/228, 238, 245; 370/225, 329, 338, 370/352, 395.52, 395.53, 401

See application file for complete search history.

(56) References Cited

U.S. PATENT DOCUMENTS

| | | | |
|---|---|---|---|
| 7,555,287 B1 | 6/2009 | Heinonen et al. | |
| 8,046,000 B2 | 10/2011 | Sylvain | |
| 2003/0105841 A1* | 6/2003 | Miyake | H04L 61/20 709/220 |
| 2004/0098506 A1* | 5/2004 | Jean | H04L 61/2015 709/245 |
| 2005/0108431 A1* | 5/2005 | Park | H04L 61/2015 709/245 |
| 2006/0280189 A1* | 12/2006 | McRae | H04L 12/462 370/401 |
| 2009/0219831 A1 | 9/2009 | Shaker et al. | |
| 2009/0274132 A1* | 11/2009 | Aono | H04L 61/2015 370/338 |

(Continued)

OTHER PUBLICATIONS

International Search Report dated Apr. 5, 2017.

*Primary Examiner* — Dustin Nguyen
*Assistant Examiner* — Hao H Nguyen
(74) *Attorney, Agent, or Firm* — Hani Z. Sayed; Rutan & Tucker, LLP

(57) ABSTRACT

A network device providing access to an external device by configuring the network device to control the flow of traffic from the external device to the network device. The flow control may include retrieving an IP address or port number from a bridged device and applying it to a stack stored in the memory of the network device so that the bridged device and network device share the same IP address.

6 Claims, 5 Drawing Sheets

(56) References Cited

U.S. PATENT DOCUMENTS

| | | | |
|---|---|---|---|
| 2009/0300178 A1* | 12/2009 | Saunderson | H04L 12/4641 709/224 |
| 2010/0161712 A1* | 6/2010 | Mehta | G06Q 10/06 709/203 |
| 2010/0332626 A1* | 12/2010 | Jonsson | H04L 29/1282 709/220 |
| 2012/0051346 A1 | 3/2012 | Herbert et al. | |
| 2012/0084462 A1* | 4/2012 | Shen | H04L 61/6013 709/245 |
| 2013/0254423 A1* | 9/2013 | George, IV | H04L 61/1511 709/238 |
| 2013/0346629 A1* | 12/2013 | Wang | H04L 61/2546 709/245 |
| 2014/0044113 A1 | 2/2014 | Chu | |
| 2014/0053246 A1* | 2/2014 | Huang | H04W 12/04 726/4 |
| 2014/0068720 A1 | 3/2014 | Somers et al. | |
| 2014/0204727 A1* | 7/2014 | Gu | H04L 9/0891 370/217 |
| 2014/0215034 A1* | 7/2014 | Chen | H04L 61/2015 709/221 |
| 2014/0254432 A1* | 9/2014 | Jagannathan | H04L 41/0886 370/255 |
| 2015/0319042 A1* | 11/2015 | PalChaudhuri | H04L 41/0873 370/395.53 |
| 2016/0080314 A1* | 3/2016 | Kang | H04W 76/14 370/329 |
| 2016/0173658 A1* | 6/2016 | Liu | H04L 69/24 709/223 |

\* cited by examiner

BRIDGING WITH WEB MANAGER ACCESS

This application claims the benefit of and priority to U.S. Provisional Application entitled "Bridging With Web Manager Access," filed on Nov. 25, 2015 having application Ser. No. 62/260,139.

FIELD

The field of the present disclosure generally relates to network bridging while allowing for web manger access. More particularly, the field of the invention relates to an apparatus and a method to connect an external device to a network device such as a router to allow communication with network applications and services when the number of network resources may limited be such that the number of interfaces, ports and/or IP addresses that can be assigned to external devices are limited.

BACKGROUND

A router is a device that may be used to connect two network segments, which may be, for example, a device connected to a selected interface of a router. The router typically operates transparently and controls on a packet-by-packet basis whether or not to forward data to/from the device to/from the selected interface. Typically, any other traffic other than that identified as being transmitted between the identified device and the selected interface would be excluded.

One problem that occurs when attempting to connect an external device to a network device such as router is that the network device may not contain sufficient resources to complete the connection. For example, when constructing a low cost network device using standard chipsets, there may not be enough interfaces or ports available for connection and configuration of the external device.

What has been needed, but previously unavailable, is a device and or method for permitting an external device to communicate via a selected network device interface, in spite of adequate resources. Such a device and method may be included in one or more applications configured to control the flow of packets between the network device and the external IP in a manner that works around the lack of resources. Such a device or method may also allow the communication between the network device and the external device in such a way so that the IP address of the external device may be shared with the network device. The present invention satisfies these, and other, needs.

SUMMARY OF THE INVENTION

In its broadest aspect, the methods and apparatus of the various embodiments of the invention are achieved by providing server and client applications that are configured to share the MAC or IP address of a network device with a bridged device. Normally all of the packets to and from a bridged device would flow unaltered from and to the network interface it is bridged to, thus precluding application packet flows with either of them. This invention permits an application, such as a web manager, to be accessed from network interface in spite of this attachment of a bridged device.

In another broad aspect, the invention includes a network device having both an ap0 interface implementing a DHCP server and a DNS server. The DNS server allows a device to discover an IP address of the network device. The DHCP server assigns local IP addresses to devices joining a network.

In additional, the network device may also have a wlan0 interface implementing a DHCP client and a DNS client. In another aspect, the DHCP client of the wlan0 interface may be disabled, allowing the interface to be programmed to accept an assigned IP address which matches the IP address of a bridged device. In this way, the IP address of the bridged device is "hitchhiked" and used by the wlan0 interface of the network device to allow access to any applications, such as, for example, a web manager, operating as an application to communicate with the wlan0 network.

In yet another broad aspect, the invention includes a method for discovering and hitchhiking the IP address of a bridged device that is running a DHCP client. In this aspect, the network device starts its own DHCP client only if the bridged device is not yet operating on the network. When the bridged device network interface comes up, the network device stops its own DHCP client, and listens to determine when a DHCP ACK is transmitted to the bridged device. The router or network device then recognizes the settings being sent to the bridged device and applies the settings, which will also contain the IP address of the bridged device, to a protocol stack in a memory associated with the network device, so that the network device now has the same IP address as the bridged device.

In still another aspect, the invention includes a network device, comprising: an access point server having a DHCP server and a DNS server; a processor in communication with the access point server, the processor being programmed using programming commands to analyze incoming traffic being broadcast by an external device and to determine if an IP address received by the access point server to which the incoming traffic is addressed is the IP address of the access point server, and if the received IP address is the address of the access point server, allowing the traffic to be communicated to a network layer of the network device; wherein external devices connected to the access point server can communicate with the network device and applications running on the network device. In one alternative aspect, the network device is a router.

In another aspect, the invention includes a network device, comprising: an access point client having a DHCP client; a processor in communication with the access point client, the processor being programmed using programming commands to analyze incoming traffic from an external device, to determine if a port address received by the access point client is a port address associated with the network device, and if the received port address is the port address of the network device, directing the content of the packet to a stack stored in a memory of the network device.

In another aspect, the processor is programmed to determine if a link to the external device is up. In yet another aspect, if the processor determines that the link to the external device is up, the processor is programmed to stop the DHCP client of the access point client if the DHCP of the access point is running. In still another aspect, the processor is further programmed to analyze packets of data received by the access point client to determine if an ACK response from the external device is present in the received packets, and if an ACK response from the external device is present in the received packets, the processor is programmed to retrieve selected settings from the received packets. In still another aspect, the processor is programmed to apply at least one of the retrieved selected settings to a protocol stack stored in a memory of the network device. In yet another aspect, the at least one selected setting is an IP address of the external device.

In yet another aspect, the present invention includes a network device, comprising: an access point client having a DHCP client and a DNS client; a processor in communication with the access point client, the processor programmed to determine whether an external device is connected with the access point client, and if a port address received by the network device is a port address of an application running on the external device, directing the content of the packet to a stack stored in the memory of the network device.

In another aspect, the network device is programmed to determine if the external device link is up. In still another aspect, the processor is programmed to stop the DHCP client of the access point client if the external device link is up. In yet another aspect, the processor is programmed to retrieve selected settings from the external device. In still another aspect, the processor is programmed to apply at least one of the retrieved selected settings to a protocol stack of the network device. In yet another aspect, the at least one of the selected settings applied to the protocol stack of the network device is an IP address of the external device.

In still another aspect, the present invention includes a method for configuring a network device to have the same IP address as an external device connected to a network, comprising: determining if a link to the external device is up; determining, if the link to the external device is up, whether the external device has a DHCP client running; listening, by the network device, for a DHCP ACK response being transmitted to the external device by the network; retrieving, by the network device, at least one selected setting from packets sent to the external device when the DHCP ACK response is detected; applying at least one of the retrieved settings to a stack stored in a memory of the network device to configure the network device to provide for communication between applications running on the network with the external device. In another aspect, the at least one retrieved setting applied to the stack is an IP address associated with the external device.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 5 is a block diagram of a method of operation of a network device in accordance with principles of the present invention illustrating flow of packets depending on which interface a bridged device is communicating with.

DETAILED DESCRIPTION OF THE PREFERRED EMBODIMENTS

Figure 1:
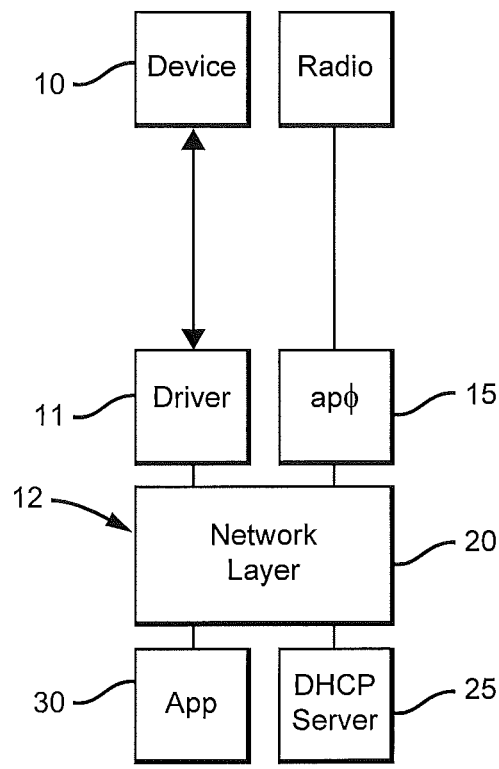
FIG. 1 is a block diagram illustrating an embodiment of a network device, such as a router, showing an external device connected to a driver in communication with the network device.

As will be described hereinafter in greater detail, the various embodiments of the present invention relate to an apparatus and method for providing network bridging while allowing for web manager access when the bridging interface is connected to a bridged device. For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

In the following description, numerous specific details are set forth in order to provide a thorough understanding of the present invention. It will be apparent, however, to one of ordinary skill in the art, that the present invention may be practiced without these specific details. In other instances, well known components or methods have not been described in detail but rather in a block diagram, or a schematic, in order to avoid unnecessarily obscuring the present invention. Further specific numeric references such as "first driver," may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present invention. The term "coupled" is defined as meaning connected either directly to the component or indirectly to the component through another component.

Throughout the description reference will be made to various software programs and hardware components that provide and carryout the features and functions of the various embodiments of the present invention. Software programs may be embedded onto a machine-readable medium. A machine-readable medium includes any mechanism that provides, stores or transmits information in a form readable by a machine, such as, for example, a computer, server or other such device. For example, a machine-readable medium includes read only memory (ROM); random access memory (RAM); magnetic disk storage media; optical storage media; flash memory devices; digital video disc (DVD); EPROMs; EEPROMs; flash memory; magnetic or optical cards; or any type of media suitable for storing electronic instructions.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, do not refer to the action and processes of a general purpose computer system, or similar electronic computing device. Rather, in the context of the below description, such terms relate to processes carried out by a computer or similar electronic computing device that manipulates and transforms data represented as physical (electronic) quantities within the computer system's registers and memories into other data similarly represented as physical quantities within the computer system memories or registers, or other such information storage, transmission or display devices, under the control of embedded or software programming commands specifically designed to carry out the specific functions of the various embodiments of the invention.

In an embodiment, the logic consists of electronic circuits that follow the rules of Boolean Logic, software that contain patterns of instructions, or any combination of both.

The term "server" is used throughout the following description. Those skilled in the art understand that a server is a computer program that provides services to other computer programs running on the same computer or processor as the server application is running, and/or other computers or processors different from the computer or processor on which the server is running. Often, the computer or processor on which the server program is running is referred to as the server, although other programs and applications may also be running on the same computer or processor. It will be understood that a server forms part of the server/client model. As such, the processor running the server program may also be a client, requesting services from other programs, and also operate as a server to provide services to other programs upon request. It is understood that the computer or processor upon which a server program is running may access other resources, such as memory, storage media, input/output devices, communication modules and the like.

Similarly, a cloud server is a server that provides shared services to various clients that access the cloud server through a network, such as a local area network and the Internet. In a cloud based system, the server is remote from the clients, and various clients share the resources of the cloud server. Information is passed to the server by the client, and returned back to the client through the network, usually the Internet.

The term "router" is also used throughout the following description. A router is a hardware device including software for carrying out varying functions that is used to direct information from one local network to another network connection. The software that defines the operation of the hardware components and controls the flow of information through the router can be, as discussed below, modified as needed to carry out specific aspects of traffic flow control.

Exemplary methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional blocks not illustrated.

The illustrated methods may be implemented as processor executable instructions stored on computer readable media. Such instructions, when executed by a processor, computer or server, cause the processor, computer or server to perform the illustrated method or methods.

FIG. 1 is a block diagram graphically illustrating a conventional attachment of a device to a local network. The device interface could be Ethernet, RNDIS over USB, PPP, or any other interface that conveys packets bi-directionally. A device 10 to be connected to a network is connected to a router 12 through an access point server 15, which for convenience is labeled "ap0". Those skilled in the art will understand that while the term "ap0" is used throughout, each type of interface will have its own driver, such as, for example, wired Ethernet has an eth0 driver, and the like.

External device 10 may be any network or external device that may be desired to connect to the router or network device. The external device may or may not include a DHCP (Dynamic Host Configuration Protocol) client. DHCP is a network protocol that enables a device to automatically be assigned an IP address from a DHCP server elsewhere on the network. As shown in FIG. 1, device 10 may be connected through an interface or driver 11 to the router or network device 12.

The access point server 15 is in communication with network layer 20 of the router or network device. Typically, a DHCP server 25 is also in communication with the network layer 20. Additionally, an application, such as a web manager, may also be in communication with the network layer 20. The DHCP server assigns local IP addresses to devices joining the network. A DNS server may also be included that allows a device to discover the IP address of the router.

Conventionally, the device may be configured with a static IP address outside of the range of addresses assigned to the access point 15. Alternatively, the device may include a DHCP client and hence receive an IP address from DHCP server 25. In either case, device 10 may communicate with applications 30 or other devices connecting via access point 15.

Note that this arrangement requires use of an interface on the router or network device. In constructing a low cost module with standard chip based building blocks, a spare interface may not be available.

Figure 2:
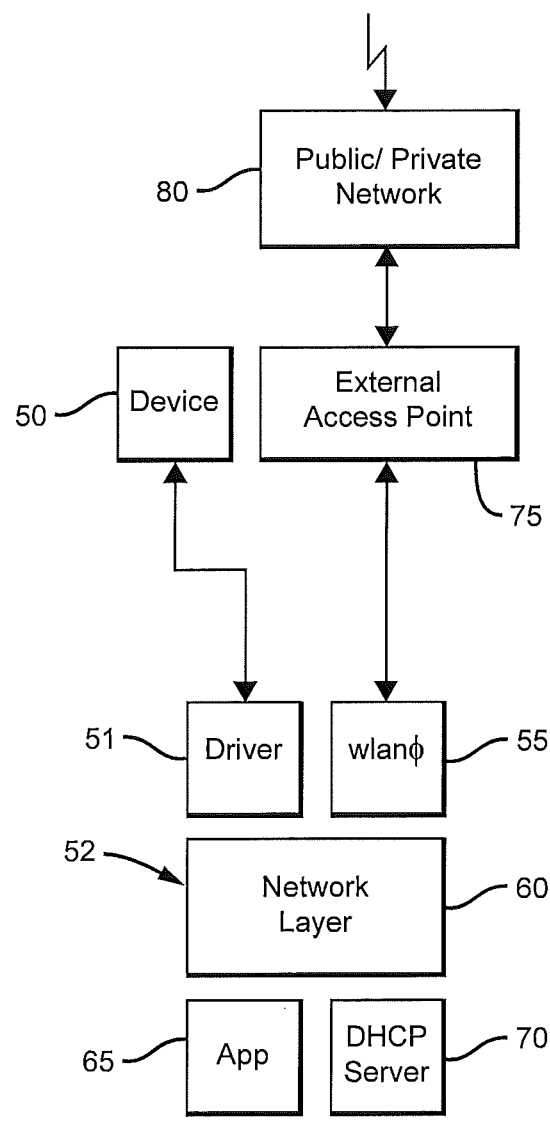
FIG. 2. is a block diagram illustrating an embodiment of a network device, such as a router, showing an external device connected to a driver in communication with the network device.

FIG. 2 is a block diagram graphically illustrating limitations arising from conventional attachment of a device to a network via an access point client. The device interface could be Ethernet, RNDIS over USB, PPP, or any other interface that conveys packets bi-directionally. A device 50 to be connected to a network is connected to a router 52 which facilitates communications across its multiple interfaces. The device may or may not include a DHCP client. As shown in FIG. 2, device 50 may be connected using a suitable driver 51 which may facilitate communication using a USB, Ethernet, or other interface.

The access point client 55 (wlan0) is in communication with network layer 60 of the router. Typically, a DHCP server 70 is also in communication with the network layer 60. Additionally, an application, such as a web manager, may also be in communication with the network layer 60. The DHCP server assigns local IP addresses to devices joining the network. A DNS server may also be included that allows a device to discover the IP address of the router.

Conventionally, the device may be configured with a static IP address. Alternatively, the device may include a DHCP client and hence receive an IP address from DHCP server 70. In either case, device 50 must use a local address, which is outside the range of addresses which may be routed by a public network, and hence may communicate with application 65 but not with any devices connecting via access point client 55.

This limitation is overcome by introducing Network Address Translation (NAT). NAT is a method of remapping one IP address space into another by modifying network address information in IP datagram packet headers while they are in transit across a traffic routing device. Thus, packets transmitted from device 50 have their local address replaced with the address of wlan0 55 and their local port replaced with a port from a pool belonging to NAT. Packets transmitted from wlan0 55 to device 50 in the reverse direction get the reverse translation.

Another limitation comes from the wlan0 access point client 55. Typically wlan0 can participate using only a single address with access point servers. Using NAT, the packets are translated into a single wlan0 address, so this problem is overcome.

Because this arrangement requires use of both an interface on the router and NAT, additional resources may need to be available on the router which the router may not be able to provide. NAT requires memory for a translation table; additionally an additional interface is needed. Thus, when constructing a low cost module with standard chip based building blocks, neither a spare interface nor the table memory may be available.

Figure 3:
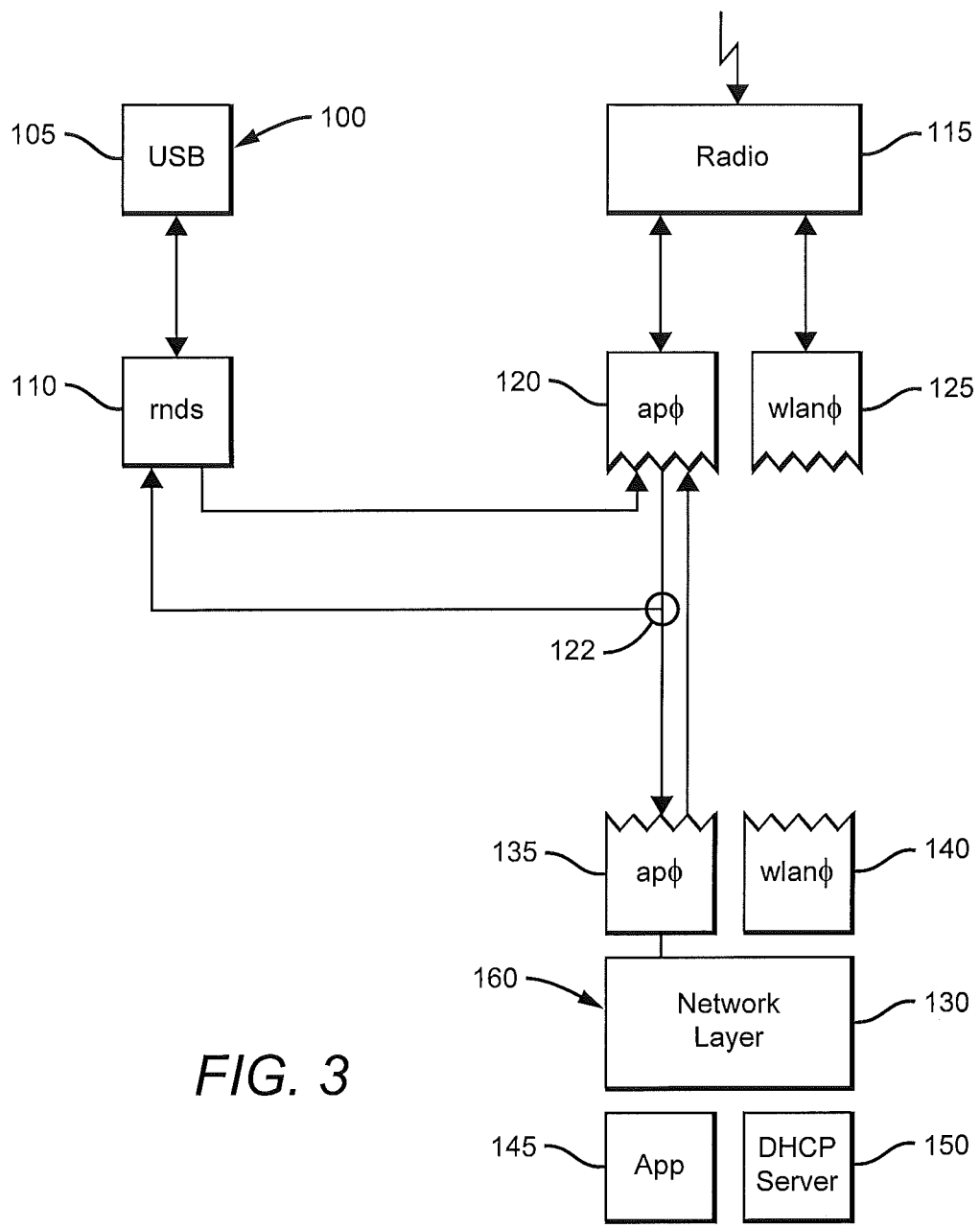
FIG. 3 is a block diagram of an embodiment of a network device in accordance with principles of the present invention illustrating traffic flow between the network device and the bridged device when the bridged device is communicating with the network device through an ap0 interface.

FIG. 3 is a block diagram of system where a device is connected to a router 160 either by way of a USB 105 connection through rndis 110 or through a transceiver 115. It will be understood from the wavy lines separating access point server ap0 120, 135, that these are the same access point server, the wavy lines indicating that the access point server has been split so that the traffic flow through this configuration may be more easily illustrated. Additionally, while the term router is used throughout this description, that term also to any network device that includes hardware and software programmed to carry out the functions of the various embodiments of the present invention.

In the configuration shown in FIG. 3, the device to be bridged is connected to access point server interface ap0 120, 135. In this configuration, the external network (rndis) 110 must be configured with a different IP address than ap0 120, 135 and different from all IP addresses that DHCP server 150 might assign. A user assigns a static IP address to ap0 120, 135 and also assign a network mask that establishes the range of IP addresses that DHCP server 150 can assign.

As will be discussed in more detail, this configuration employs a bridging technique different from that used by a conventional bridge to direct traffic to and from the bridged device.

The configuration of this embodiment is implemented by applying the broadcast/select logic shown in FIG. 3. Information being transmitted by the device is received by ap0 120. Traffic from the network device or router is passed through ap0 135 to ap0 120.

Traffic from ap0 120 to ap0 135 is analyzed by a processor of the router or network device programmed using programming commands at point 122 to intercept the traffic before the traffic is either passed from ap0 120 to rndis 110 or to ap0 135. Broadcast packets, identified by their address, are transmitted to both rndis 110 and ap0 135. This can be accomplished by copying the packet, send one copy to rndis 110, and the other copy to ap0 135, or by presenting the same packet sequentially to each of rndis 110 and ap0 135. Non-broadcast packets are examined and then sent to either rndis 110 or ap0 135 based on their destination address.

The process described above is accomplished by having the processor of the router or network device monitor the traffic being received at ap0 120 and inspect the headers of the received packets. As stated previously, when the header indicates that it is a broadcast packet, the packet is directed to both ap0 135 and the bridged device. If the packet is a non-broadcast packet, the processor forwards the packet to be passed either to ap0 135 or to the bridged device, depending on the destination address contained in the packet. This traffic control prevents unnecessary traffic flow to the router or network device 160 from device 100 if the traffic is not directed to the router or network device and its attached network, which is advantageous when services provided by the router are limited.

Figure 4:
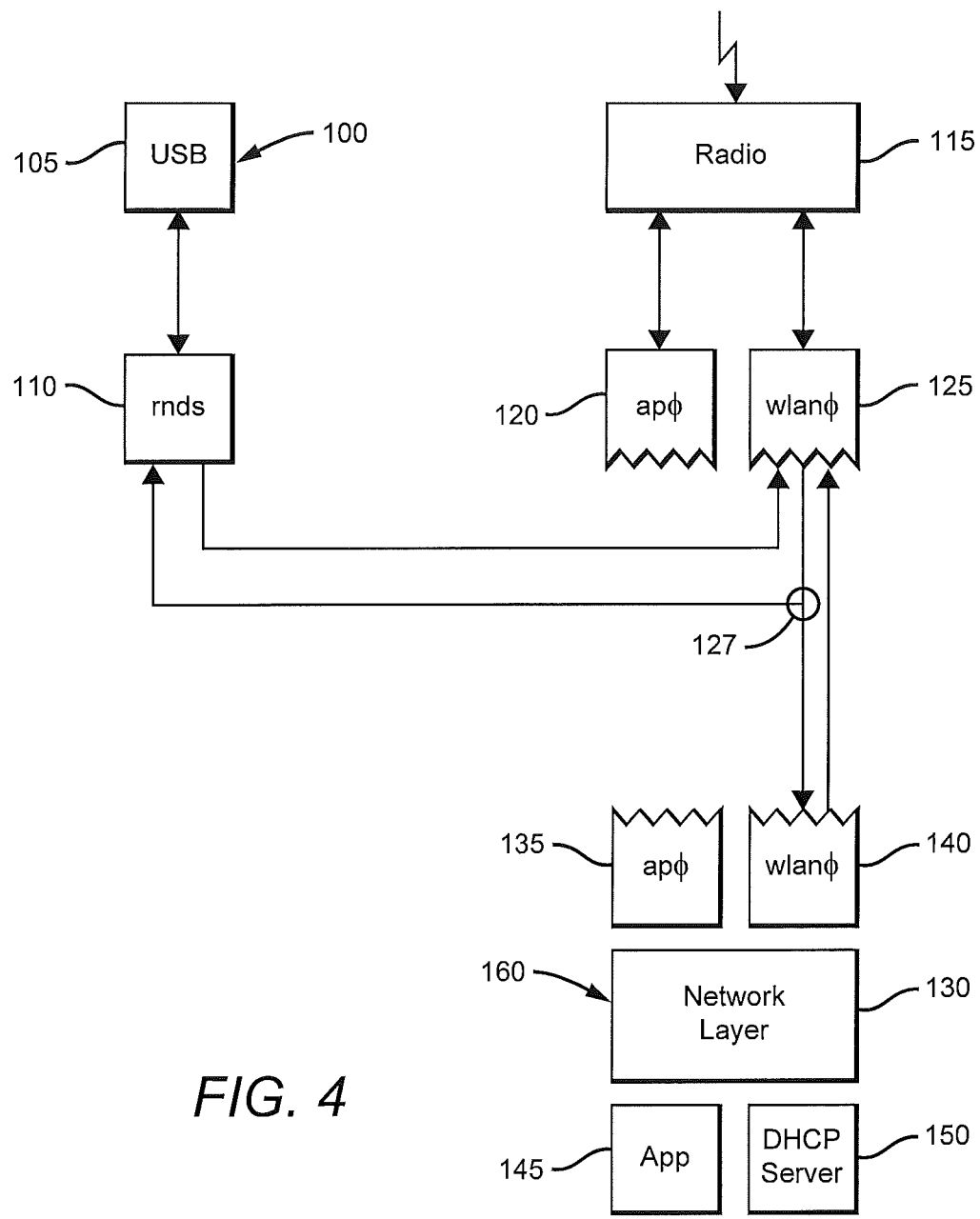
FIG. 4 is a block diagram of an embodiment of a network device in accordance with principles of the present invention illustrating traffic flow between the network device and the bridged device when the bridged device is communicating with the network device through a wlan0 interface.

FIG. 4 is a graphical illustration of another embodiment of a network device or router in accordance with the principles of the present invention. Similar reference numerals have been used to identify like features as described with reference to FIG. 3.

In the configuration shown in FIG. 4, bridged device is shown being connected to router or network device 160 through access point client wlan0 125, 140. As stated previously with respect to access point ap0 120, 135, it will be understood from the wavy lines separating access point client wlan0 125, 140 that these are the same access point client wlan0, the wavy lines indicating that wlan0 125 and wlan0 140 have been split so that the traffic flow through this configuration may be more easily illustrated.

Router or network device 160 implements a DHCP client and a DNS client in wlan0 interface 140. The IP address of the wlan0 of router or network device 160 is typically assigned by a DHCP server on the wlan0 network.

In this configuration, the bridged device typically may not have a static IP, but rather runs its own DHCP client to accept an assigned IP address. The IP address of the wlan0 140 interface must match the bridged device's IP address; otherwise some access point servers may not function properly.

Since both bridged device 100 and router or network device 160 both have DHCP clients, only one DHCP can be allowed to operate. This problem is solved by the various embodiments of the present invention by allowing the bridged device to negotiate its own IP address, which then is hitch hiked by the router 160 so that the bridged device and the router have the same IP addresses when the bridged device is connected to the router. In this configuration, wlan0 monitoring point 127, using programming commands to discover the IP address of the bridged device 100, "hitch hikes" that IP address for use by the wlan0 client 140. When this done, the DHCP client of router or network device 160 is turned off. However, if the bridged device is not connected to the router or network device, the DHCP client of the router or network device is allowed to run.

The configuration of one exemplary embodiment is implemented by applying the broadcast/select logic shown in FIG. 4. Information being transmitted by radio 115 to wlan0 interface 140 is analyzed at wlan0 monitoring point 127, and is forward on depending on the packet type and destination (TCP or UDP) port. Broadcast packets, identified by their address, are transmitted to both rndis 110 and wlan0 140. This can be accomplished by copying the packet, send one copy to rndis 110, and the other copy to wlan0 140, or by presenting the same packet sequentially to each of rndis 110 and wlan0 140. Non-broadcast packets are examined and then sent to either rndis 110 or wlan0 140 based on their destination address.

The process described above is accomplished by having the processor of the router or network device monitor the traffic being received at wlan0 125 and inspect the headers of the received packets. As stated previously, when the header indicates that it is a broadcast packet, the packet is directed to both wlan0 140 and the bridged device. If the packet is a non-broadcast packet, the processor forwards the packet to be passed either to wlan0 140 or to the bridged device, depending on the destination address contained in the packet. This traffic control prevents unnecessary traffic flow to the router or network device 160 from device 100 if the traffic is not directed to the router or network device and its attached network, which is advantageous when services provided by the router or network device are limited.

Figure 5:
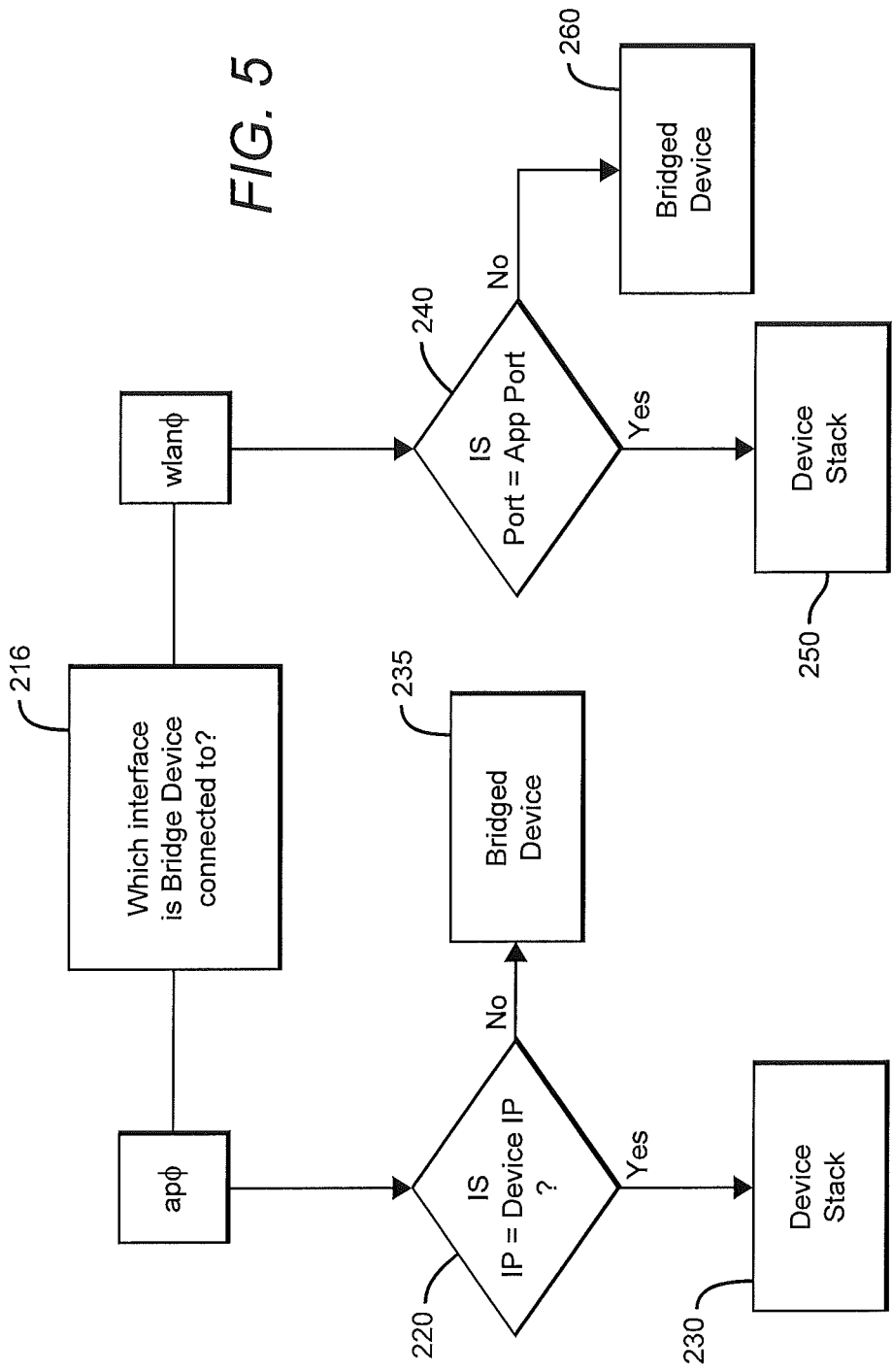

FIG. 5 is a block diagram illustrating a method of one embodiment of a router or network device programmed to employ the various types of traffic control of the present invention discussed above. In this exemplary embodiment, an IP stack is established in a memory of the router or network device and operates in parallel to the IP stack in a memory of the bridged device while using a different port number for IP web service. The bridged device sends its frames to the interface selected during configuration, which, may be ap0 or wlan0. This process is only used to analyze and direct non-broadcast packets because broadcast packets are sent to both the stack of the bridged device and to the protocol stack in the router or network device by definition.

Depending on which interface the non-broadcast packets are sent to, as shown by box 210, the non-broadcast packets may be directed either to either ap0 or wlan0 interfaces. If the packets are directed to ap0, the packets are analyzed in box 220 to determine what IP address the non-broadcast packets is addressed to. If the destination IP address is the IP address of the router or network device, then the TCP and UDP non-broadcast packets are directed to the protocol stack 230 of the router or network device. If the destination IP address is not the IP address of the router of network device, then the non-broadcast packets are sent to the bridged device in box 235.

If the non-broadcast packets are directed to the wlan0 interface, the TCP packets from the bridged device are analyzed to determine if they are directed to a port number assigned to the application which may be, for example, a web manager, in box 240. If the packets are addressed to the port of an application, such as, for example, a web manager, they are provided to the protocol stack of the router or network device in box 250. If the packets that are not directed to the application port, those packets are instead directed to the bridged device in box 260.

Figure 6:
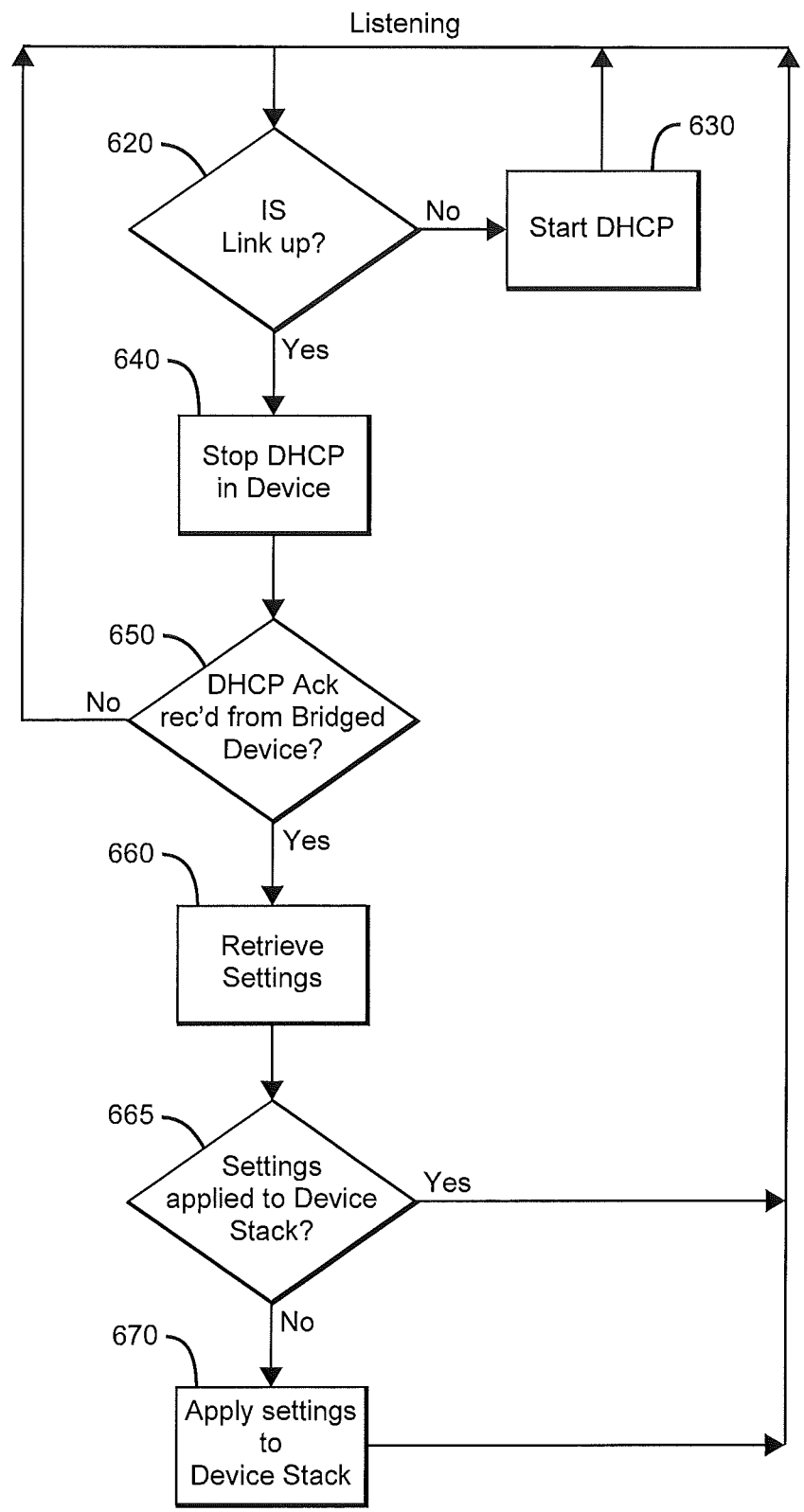
FIG. 6 is a block diagram of a method in accordance with principles of the present invention illustrating discovery of an IP address of a bridged device and applying the discovered IP address to a protocol stack stored in a memory of a network device when the bridged device is communicating over a wlan0 interface to the network device.

FIG. 6 is a block diagram of a an exemplary method illustrating discovery of an IP address of a bridged device and applying the discovered IP address to a protocol stock stored in a memory of the router or network device when the bridged device is communicating over the wlan0 interface.

Typically, the processor of the router or network device is continuously listening on its various ports and interfaces for packets that need to be communicated forward through the network to the IP addresses contained in those packets. In the embodiment illustrated here, the processor is listening for a link to the bridged device that indicates that the link to the bridged device is up. If the link is not detected, the router or network device starts up its own DHCP client in box 630. As shown in FIG. 6, once the DCHP client in the router or network device has been started, the router continues to monitor to determine whether the link to the bridged device comes up.

If the processor detects that the link is up, the processor issues a command to stop its own DHCP client in box 640, and then listens for a DHCP ACK response sent to the bridged device by the network in box 650. If the processor does not detect the DHCP ACK response, the processor continues to listen and the process returns to box 620.

When the processor detects the DHCP ACK response, the processor retrieves various settings, including the bridged device's IP address, from the DHCP ACK packet in box 660. The processor then determines whether the settings have already been applied to the stack of the router or network device in box 665. If the settings have been applied to the stack, the process returns back to box 620.

If the settings have not been applied to the stack of the router or network device, the processor then applies the settings to the stack stored in the memory of the router or network device in box 670. The applied settings include the retrieved IP address of the bridged device. Thus, the IP address of the router or network device is now configured to be the same as the IP address of the bridged device.

From the above, it will be apparent that the present invention may be implemented by computers, servers or other processors organized in a conventional distributed processing system architecture. The various embodiments of the present invention, however, are not conventional, because they bridge multiple remote information sources, such as legacy computer applications, legacy storage media and data resident on workstation storage and other media.

One advantage of the various embodiments of the present invention is that an application, such as a web manager, can be accessed by the network while a bridged device is connected to a network through a router or network device. This provides a pathway so that the operation of the bridged device may be monitored and/or controlled; in contrast, the use of a conventional bridge would prohibit such access.

The present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

The invention claimed is:

1. A network device, comprising:
an access point client having a first DHCP client and a DNS client; and a processor in communication with the access point client, the processor programmed to determine whether a link associated with an external device is connected with the access point client, and if a port address received by the network device is a port address of an application running on the external device, directing a content of a packet to a stack stored in a memory of the network device, wherein the processor is programmed to stop the first DHCP client of the access point client in response to the determination and verification of the external device utilizing a second DHCP client, wherein the processor is programmed to listen for a DHCP ACK response message from the external device in order to stop the first DHCP client, and wherein if the listened DHCP ACK response message is not received via the link to the external device, or if the directed content of the packet having already been applied to the stored stack, the processor is programmed to continue to listen and determine whether at least one of the link and any other link are up, wherein the processor is programmed to apply at least one of the retrieved selected settings to a protocol stack of the network device, wherein the at least one of the selected settings applied to the protocol stack of the network device is an IP address of the external device.

2. The network device of claim 1, wherein the network device is programmed to determine if a link associated with the external device is up.

3. The network device of claim 2, wherein the processor is programmed to stop the DHCP client of the access point client if the link is up.

4. The network device of claim 1, wherein the determination of the external device utilizing a second DHCP client is via a wireless local area network (WLAN) client monitoring point.

5. The network device of claim 4, wherein the WLAN client monitoring point receives commands to discover an IP address of the external device.

6. The network device of claim 1, wherein the verification is accomplished via receipt of a DHCP ACK message.

* * * * *